United States Patent Office 3,513,948
Patented May 26, 1970

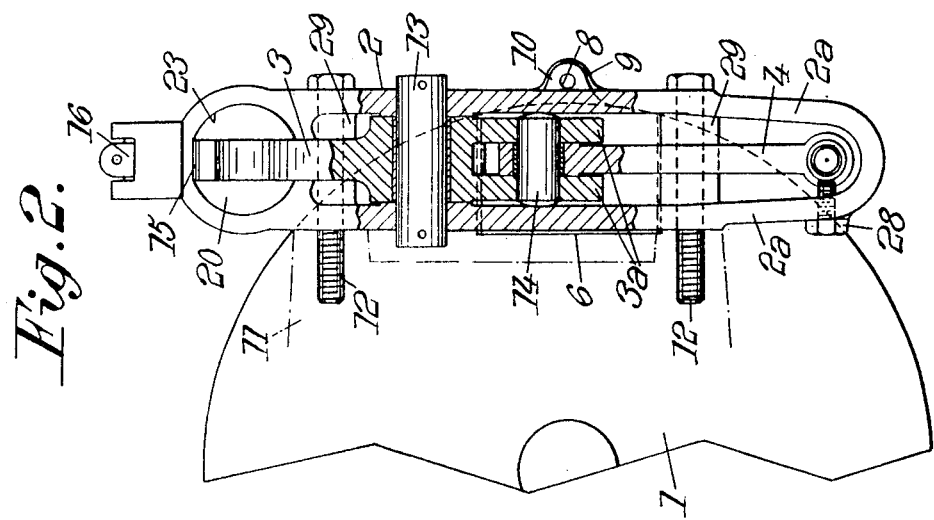
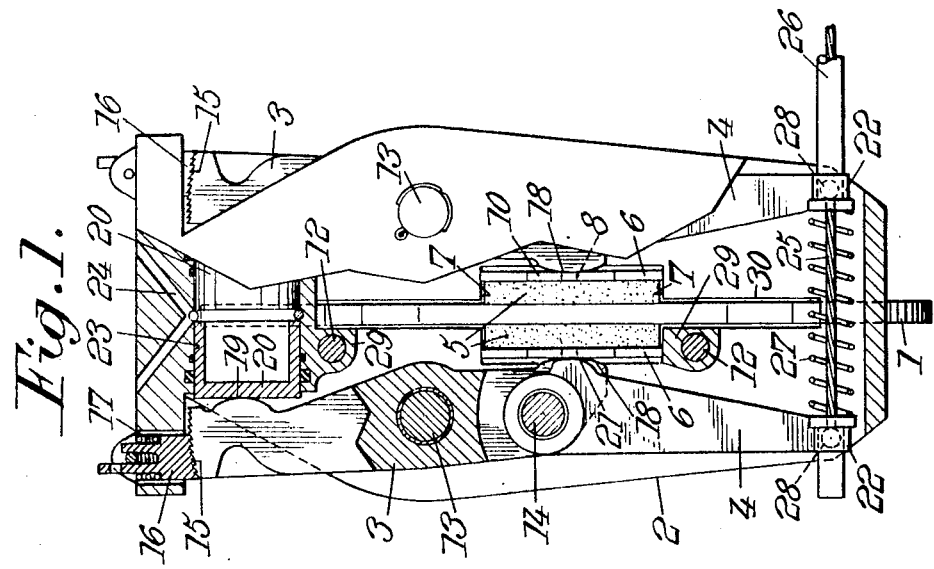

3,513,948
DISC BRAKE HAVING A DOUBLE PRESSURIZED FLUID/MECHANICAL CONTROL
Edmond Henry-Biabaud, Paris, France, assignor to Societe Anonyme Automobiles Citroen, Paris, France, a society of France
Filed Sept. 23, 1968, Ser. No. 761,692
Claims priority, application France, Sept. 25, 1967, 122,148
Int. Cl. F16d 65/14
U.S. Cl. 188—106     5 Claims

ABSTRACT OF THE DISCLOSURE

Primary levers, actuated by pressurized fluid, are articulated on the brake frame, and are provided, each, with a device for taking up play to limit their unclamping stroke. Secondary levers, actuated mechanically, are articulated respectively on the primary levers such that these secondary levers, during their clamping stroke, tend by reaction to move the primary levers in the direction of the limited unclamping stroke.

---

The present invention relates to disc brakes of the type in which a disc, driven by the shaft to be braked, can be pinched between two friction elements which are guided on a stationary frame and which are actuated, each, not only by a primary lever moved by a pressurized fluid control, but also by a secondary lever moved by a mechanical control.

An object of this invention is to provide brakes of this type which are simple, light and not too costly.

For this purpose, the brake according to this invention is characterized by the fact that the primary levers are articulated on the brake frame and are provided, each, with a device for taking up play adapted to limit their unclamping stroke, and by the fact that the secondary levers are articulated respectively on the primary levers in a manner such that these secondary levers, during their clamping stroke, tend by reaction to move the primary levers in the direction of their unclamping stroke, which, due to the limitation imposed on this stroke by said device, ensures, for each secondary lever, a spindle of articulation practically fixed with respect to the frame.

This invention will, in any case, be able to be well understood from the following complementary description, as well as from the accompanying drawings, which complementary description and drawings are, of course, given merely by way of example.

FIGS. 1 and 2 of these drawings show a disc brake established according to the invention, respectively in elevation (perpendicular to the disc) and in plan (parallel to the disc), with parts cut away.

The disc brake shown in the drawings is intended for automobile vehicles, and more particularly for light vehicles.

With respect to the brake in its overall aspect, it can be established in any appropriate manner such that its disc 1, driven by the shaft to be braked (wheel or transmission), can be pinched between two friction elements which are guided on a stationary frame 2 and which are actuated, each, not only by a primary lever 3 moved by a pressurized fluid control, but also by a secondary lever 4 moved by a mechanical control. Each friction element comprises in general a friction lining 5 fixed to a rigid plate 6. These plates are guided parallel to the axis of the disc by smooth surfaces 7 belonging to the frame 2 and they are maintained radially on this frame by pins (not shown), or analogous removable members, which traverse aligning holes 8 respectively on lugs 9 and 10 provided on the frame 2 and the plates 6. The frame itself can be fixed to an element of the structure of the vehicle, such as the transmission case 11, by bolts 12.

This being the case, according to this invention, the primary levers 3 are articulated on the frame 2 by means of spindles 13 parallel to the plane of the disc 1, each of these primary levers 3 is provided with a device for taking up play adapted to limit their unclamping stroke, and the secondary levers 4 are articulated respectively on the primary levers 3 by means of spindles 14 so that these secondary levers 4, during their clamping stroke, tend by reaction to move the primary levers 3 in the direction of their unclamping stroke.

As shown in FIG. 1, each device for taking up play can comprise a sector 15 provided, on the end of the primary lever 3 being considered, with teeth bevelled so that they can lift, solely in the direction corresponding to clamping of the brake by this lever, a push-piece 16 urged toward the sector 15 by a spring 17, this push-piece 16 itself being also provided with bevelled teeth. In the opposite direction, the teeth of the push-piece 16 catch the teeth of the primary lever 3 whose angular stroke of unclamping is thus at the most equal to the angular separation between two of its teeth.

Advantageously, the primary levers 3 are arranged as levers of the first kind and the secondary levers 4 as levers of the second kind. For this purpose, as the levers 3 and 4 are approximately aligned two by two, the spindle 13 of each pair of associated levers is disposed on an intermediate part of the lever 3 which carries, at its end in the neighbourhood of the lever 4, not only the spindle 14, but also a bearing surface 18 for the neighbouring plate 6, and at the other end, not only the sector 15, but also a bearing surface 19 for a piston 20. As for the secondary lever 4, which is mounted on the spindle 14 at its end in the neighbourhood of the primary lever 3, it carries, on an intermediate part, a bearing surface 21 for the plate 6, and at its other end, a hooking element 22 for the mechanical control. As can be seen in FIG. 1, the two bearing surfaces 18 (primary lever 3) and 21 (secondary lever 4) are preferably situated in the same diametrical plane of the disc 1. According to the preferred embodiment, each lever 3 has the form of a fork whose two branches 3a embrace the lever 4 and are traversed by one of the spindles 14; in this case, each bearing surface 18 is divided into two elementary surfaces formed respectively on the branches 3a.

In order that the pistons 20 can act on the primary levers 3, these pistons are both housed in a cylinder 23 parallel to the axis of the disc and traversing symmetrically the plane of this disc, and a canalization 24 is arranged to lead into this cylinder, between the two pistons 20, thus permitting the arrival of pressurized fluid, in general, oil, under the effect of pressure exerted on a brake pedal or its analogue. Moreover, the hooking elements 22 can serve as abutments respectively for the cable 25 and for the sheath 26 of a flexible transmission of the type having a cable in a sheath, this flexible transmission leading to a parking brake pedal or lever. The mechanical control can be completed by a return spring 27 and by abutments 28 rigid with the frame 2 and adapted to limit the unclamping stroke of the secondary levers 4 and constituted, for example, by screws.

The frame 2 is preferably formed by a hollow cast piece presenting two walls 2a perpendicular to the plane of the disc 1 and leaving between themselves a free space sufficient for the housing and the movement of the levers 3 and 4, these two walls being interconnected by transverse bosses 29 which are traversed by the bolts 12 and serve to rigidify the frame. The walls 2a can imprison the spindles 14, as shown in FIG. 2. Finally, the frame 2 comprises an opening 30 for the passage of the disc 1.

The operation of this brake is the following.

When, on the one hand, the driver acts on the main brake pedal, the pressurized fluid arriving via the canalization 24 moves the pistons 20, and consequently the faces 19 of the primary levers 3, away from each other, which moves the faces 18, and consequently the friction elements 5, 6, mutually towards each other, by rotation of these levers about the fixed spindles 13. The disc is thus braked by pinching between these elements 5, 6. When the driver ceases to act on the pedal, the levers 3 can only rotate in the opposite direction to the slight extent permitted by the devices for taking up play 15, 16, 17 under the action of return springs and/or of the reaction due to the clamping of the brake in a mechanical way, as explained hereafter.

When, on the other hand, the driver acts on the parking brake pedal or lever, the secondary levers 4 are urged by the cable 25 and the sheath 26 in the direction which moves their hooking elements 22 towards each other. The result is: on the one hand, a thrust exerted by the bearing faces 21 on the plates 6 and tending to apply the linings 5 against the disc, and on the other hand, a reaction tending to move the spindles 14 mutually away from each other. This reaction, which is absorbed by the primary levers 3, acts in the direction of unclamping of these primary levers, and thus can only make them rotate to the extent permitted by the devices 15, 16, 17 if the play has not already been taken up. The spindles 14 are thus maintained fixed, during the clamping of the disc in a mechanical way, by catching of the teeth belonging respectively to the sectors 15 of the levers 3 and to the push-pieces 16. When the driver ceases to act, the levers 4 are returned by the return spring 27.

Whatever embodiment is adopted, this invention provides a brake fulfilling the stated object, and which, in particular, possesses only a limited number of movable members disposed in a small volume.

Although this invention has been described with specific reference to a particular embodiment, various modifications and changes are possible without departing from the spirit or scope of the invention, so that the invention should not be limited to that particular embodiment.

What I claim is:

1. A brake in which a disc, driven by the shaft to be braked, can be pinched between two movable friction elements, comprising:

a stationary frame;

guide means on said frame for guiding the friction elements substantially parallel to the axis of the disc;

two primary levers of the first kind having surfaces which directly contact the friction elements respectively, when these primary levers are pivoted with a clamping stroke, for moving said friction elements towards the disc to pinch the disc therebetween;

pressurized-fluid control means for acting on said primary levers to pivot them with their clamping strokes;

two primary spindles of articulation—parallel to each other and perpendicular to the axis of the disc—on which are respectively pivotably mounted the two primary levers, each primary spindle being located on its primary lever between the region of that primary lever on which the pressurized-fluid control means act and the region of that primary lever which acts on its friction element;

said primary spindles of articulation being fixed on said frame;

a device for taking up play co-operating with each primary lever for limiting the unclamping strokes of the primary levers;

two secondary levers of the second kind having surfaces which directly contact the friction elements respectively, when these secondary levers are pivoted with a clamping stroke, for moving said friction elements towards the disc to pinch the disc therebetween;

mechanical control means for acting on said secondary levers to pivot them with their clamping strokes;

two secondary spindles of articulation—parallel to said primary spindles of articulation—on which are respectively pivotably mounted the two secondary levers, each secondary spindle being located on its secondary lever on the opposite side, with respect to the region of that secondary lever which acts on its friction element, from the region of that secondary lever on which the mechanical control means act;

said secondary spindles being located on said primary levers on the same side, with respect to the primary spindles, as the regions of those primary levers which act on the friction elements, such that these secondary levers, during their clamping strokes, tend by reaction to pivot the primary levers in the direction of their unclamping strokes, which, due to the limitation imposed on these unclamping strokes by said device, ensures, for each secondary lever, a secondary spindle of articulation which is practically fixed with respect to the frame;

in which brake there is a separate device taking up play for each primary lever, each device comprising:

a sector of bevelled teeth located on the end of the corresponding primary lever on the same side, with respect to the primary spindle, as the region on which the pressurized-fluid control means act;

and a push-piece mounted in the frame and urged towards said sector by a spring, this push-piece having bevelled teeth which co-operate with the bevelled teeth of said sector;

the direction of the bevel of the teeth of the sector and of the push-piece being such as to permit the clamping stroke of the primary lever but to prevent the unclamping stroke from exceeding the separation between adjacent teeth;

in which brake the primary levers and the secondary levers are approximatively aligned two by two, that is to say each primary lever is approximatively aligned with its corresponding secondary lever;

in which brake each primary lever has the form of a fork having two branches which embrace the corresponding secondary lever and which are traversed by the secondary spindle of articulation of this latter lever, the surface of contact of said primary lever on the corresponding friction element having two portions one formed on each of said two branches;

and in which brake the frame is formed by a hollow cast piece presenting two walls perpendicular to the plane of the disc and leaving between themselves a free space sufficient for the housing and the movement of the primary and secondary levers, these two walls being interconnected by transverse bosses which are traversed by fastening bolts and serve to rigidify the frame.

2. A brake in which a disc, driven by the shaft to be braked, can be pinched between two movable friction elements, comprising:

a stationary frame;

guide means on said frame for guiding the friction elements substantially parallel to the axis of the disc;

two primary levers of the first kind having surfaces which directly contact the friction elements respectively, when these primary levers are pivoted with a clamping stroke, for moving said friction elements towards the disc to pinch the disc therebetween;

pressurized-fluid control means for acting on said primary levers to pivot them with their clamping strokes;

two primary spindles of articulation—parallel to each other and perpendicular to the axis of the disc—on which are respectively pivotably mounted the two primary levers, each primary spindle being located on its primary lever between the region of that primary lever on which the pressurized-fluid control means act and the region of that primary lever which acts on its friction element;

said primary spindles of articulation being fixed on said frame;

a device for taking up play co-operating with each primary lever for limiting the unclamping strokes of the primary levers;

two secondary levers of the second kind having surfaces which directly contact the friction elements respectively, when these secondary levers are pivoted with a clamping stroke, for moving said friction elements towards the disc to pinch the disc therebetween;

mechanical control means for acting on said secondary levers to pivot them with their clamping strokes;

two secondary spindles of articulation—parallel to said primary spindles of articulation—on which are respectively pivotably mounted the two secondary levers, each secondary spindle being located on its secondary lever on the opposite side, with respect to the region of that secondary lever which acts on its friction element, from the region of that secondary lever on which the mechanical control means act;

said secondary spindles being located on said primary levers on the same side, with respect to the primary spindles, as the regions of those primary levers which act on the friction elements, such that these secondary levers, during their clamping strokes, tend by reaction to pivot the primary levers in the direction of their unclamping strokes, which, due to the limitation imposed on these unclamping strokes by said device, ensures, for each secondary lever, a secondary spindle of articulation which is practically fixed with respect to the frame.

3. A brake according to claim 2, wherein there is a separate device taking up play for each primary lever, each device comprising:

a sector of bevelled teeth located on the end of the corresponding primary lever on the same side, with respect to the primary spindle, as the region on which the pressurized-fluid control means act;

and a push-piece mounted in the frame and urged towards said sector by a spring, this push-piece having bevelled teeth which co-operate with the bevelled teeth of said sector;

the direction of the bevel of the teeth of the sector and of the push-piece being such as to permit the clamping stroke of the primary lever but to prevent the unclamping stroke from exceeding the separation between adjacent teeth.

4. A brake according to claim 2, wherein the primary levers and the secondary levers are approximatively aligned two by two, that is to say each primary lever is approximatively aligned with its corresponding secondary lever.

5. A brake according to claim 4, wherein each primary lever has the form of a fork having two branches which embrace the corresponding secondary lever and which are traversed by the secondary spindle of articulation of this latter lever, the surface of contact of said primary lever on the corresponding friction element having two portions, one formed on each of said two branches.

References Cited

UNITED STATES PATENTS

| 2,948,356 | 8/1960 | Butler | 188—73 |
| 3,184,004 | 5/1965 | Butler | 188—73 |
| 3,339,678 | 9/1967 | Burnett. | |
| 3,433,333 | 3/1969 | Swift. | |

FOREIGN PATENTS 1,055,326 10/1953 France.

GEORGE E. A. HALVOSA, Primary Examiner

U.S. Cl. X.R.

188—196; 74—532